United States Patent
Chen et al.

(10) Patent No.: US 7,378,378 B2
(45) Date of Patent: May 27, 2008

(54) RHEOLOGY ENHANCERS

(75) Inventors: Yiyan Chen, Richmond, TX (US); Jesse C. Lee, Paris (FR); Fang Li, Pleasanton, CA (US); Manilal Dahanayake, Princeton Junction, NJ (US); Robert Tillotson, Toms River, NJ (US); Allwyn Colaco, South River, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/279,622

(22) Filed: Apr. 13, 2006

(65) Prior Publication Data

US 2006/0229231 A1 Oct. 12, 2006

Related U.S. Application Data

(63) Continuation-in-part of application No. 11/334,158, filed on Jan. 17, 2006, now Pat. No. 7,345,012, which is a continuation-in-part of application No. 11/249,233, filed on Oct. 13, 2005, which is a continuation-in-part of application No. 11/012,446, filed on Dec. 15, 2004, and a continuation-in-part of application No. 10/325,226, filed on Dec. 19, 2002, now Pat. No. 7,084,095, and a continuation-in-part of application No. 11/033,651, filed on Jan. 12, 2005, now Pat. No. 7,320,952.

(60) Provisional application No. 60/538,025, filed on Jan. 21, 2004.

(51) Int. Cl.
*C09K 8/584* (2006.01)
*C09K 8/588* (2006.01)
*E21B 21/00* (2006.01)

(52) U.S. Cl. ............... 507/259; 507/129; 507/135; 507/136; 507/240; 507/241; 507/252; 507/260; 507/261; 507/267; 507/922; 166/308.2

(58) Field of Classification Search ............... 507/259, 507/261
See application file for complete search history.

(56) References Cited

U.S. PATENT DOCUMENTS 2,614,982 A 10/1952 Caldwell (Continued)

FOREIGN PATENT DOCUMENTS

CA 1109356 9/1981

(Continued)

OTHER PUBLICATIONS

SPE 56529—by F. F. Chang et al.—Case Study of a Novel Acid-Diversion Technique in Carbonate Reservoirs.

(Continued)

*Primary Examiner*—Randy Gulakowski
*Assistant Examiner*—John J Figueroa
(74) *Attorney, Agent, or Firm*—Darla Fonseca; David Cate; Robin Nava (57) ABSTRACT

A method for increasing the rate of shear rehealing of fluids made with cationic, zwitterionic, and amphoteric viscoelastic surfactant fluid systems by adding an effective amount of a rheology enhancer package containing, for example a polyethylene glycol-polypropylene glycol block copolymer and a polynaphthalene sulfonate. The rheology enhancer package allows viscoelastic surfactant fluids to be used at lower viscoelastic surfactant concentrations in certain applications, for example certain oilfield treatments, for example fracturing and gravel packing. Preferred surfactants are betaines and quaternary amines.

28 Claims, 9 Drawing Sheets

U.S. PATENT DOCUMENTS

| | | | |
|---|---|---|---|
| 2,614,983 A | 10/1952 | Caldwell | |
| 2,722,099 A | 11/1955 | Wasserbach | |
| 3,223,622 A * | 12/1965 | Lummus et al. | 507/131 |
| 3,292,698 A | 12/1966 | Savin | |
| 3,302,711 A | 2/1967 | Dilgren | |
| 3,342,261 A | 9/1967 | Bond | |
| 3,361,213 A | 1/1968 | Savins | |
| 3,724,549 A | 4/1973 | Dill | |
| 3,760,881 A | 9/1973 | Kiel | |
| 3,830,302 A | 8/1974 | Dreher et al. | |
| 3,880,764 A | 4/1975 | Donham | |
| 3,954,627 A | 5/1976 | Dreher et al. | |
| 3,956,173 A | 5/1976 | Towle | |
| 4,061,580 A | 12/1977 | Jahnke | |
| 4,113,631 A | 9/1978 | Thompson | |
| 4,148,736 A | 4/1979 | Meister | |
| 4,284,414 A | 8/1981 | Bryant | |
| 4,324,669 A | 4/1982 | Norman et al. | |
| 4,418,755 A | 12/1983 | Sifferman | |
| 4,432,881 A | 2/1984 | Evani | |
| 4,464,182 A | 8/1984 | Tack | |
| 4,466,486 A * | 8/1984 | Walker | 166/301 |
| 4,528,105 A * | 7/1985 | Ito et al. | 507/218 |
| 4,591,447 A | 5/1986 | Kubala et al. | |
| 4,615,825 A | 10/1986 | Toet et al. | |
| 4,664,818 A | 5/1987 | Halliday | |
| 4,695,389 A | 9/1987 | Kubala | |
| 4,725,372 A | 2/1988 | Toet et al. | |
| 4,735,731 A | 4/1988 | Rose et al. | |
| 4,741,401 A | 5/1988 | Walles et al. | |
| 4,790,958 A | 12/1988 | Toet | |
| 4,806,256 A | 2/1989 | Rose et al. | |
| 4,807,703 A | 2/1989 | Jennings | |
| 4,836,282 A * | 6/1989 | Hsieh | 166/270.1 |
| 4,931,489 A * | 6/1990 | Kucera et al. | 523/130 |
| 4,975,482 A | 12/1990 | Peiffer | |
| 5,009,799 A | 4/1991 | Syrinek et al. | |
| 5,013,462 A * | 5/1991 | Danley | 507/243 |
| 5,036,136 A | 7/1991 | Peiffer | |
| 5,092,935 A * | 3/1992 | Crema et al. | 523/130 |
| 5,093,448 A | 3/1992 | Peiffer | |
| 5,101,903 A | 4/1992 | Llave et al. | |
| 5,120,708 A * | 6/1992 | Melear et al. | 507/126 |
| 5,124,059 A | 6/1992 | Koch | |
| 5,147,907 A | 9/1992 | Rinck et al. | |
| 5,167,281 A | 12/1992 | Kalfoglou | |
| 5,203,411 A | 4/1993 | Dawe et al. | |
| 5,258,137 A | 11/1993 | Bonekamp et al. | |
| 5,310,002 A | 5/1994 | Blauch et al. | |
| 5,551,516 A | 9/1996 | Norman et al. | |
| 5,574,120 A | 11/1996 | Heidel et al. | |
| 5,617,920 A | 4/1997 | Dovan | |
| 5,760,154 A | 6/1998 | Krause et al. | |
| 5,964,295 A | 10/1999 | Brown et al. | |
| 5,979,555 A | 11/1999 | Gadberry et al. | |
| 5,979,557 A | 11/1999 | Card et al. | |
| 6,035,936 A | 3/2000 | Whalen | |
| 6,051,562 A * | 4/2000 | Chamberlain et al. | 514/89 |
| 6,063,737 A | 5/2000 | Haberman | |
| 6,133,204 A | 10/2000 | Newhouse | |
| 6,140,277 A | 10/2000 | Tibbles et al. | |
| 6,148,917 A | 11/2000 | Brookey et al. | |
| 6,187,065 B1 | 2/2001 | Jackson | |
| 6,194,356 B1 | 2/2001 | Jones et al. | |
| 6,207,780 B1 | 3/2001 | Stockhausen et al. | |
| 6,232,274 B1 | 5/2001 | Hughes et al. | |
| 6,258,859 B1 | 7/2001 | Dahayanake et al. | |
| 6,306,800 B1 | 10/2001 | Samuel et al. | |
| 6,348,436 B1 | 2/2002 | Langlois | |
| 6,367,548 B1 | 4/2002 | Purvis et al. | |
| 6,399,546 B1 | 6/2002 | Chang et al. | |
| 6,412,561 B1 | 7/2002 | Brown et al. | |
| 6,433,075 B1 | 8/2002 | Davies et al. | |
| 6,435,277 B1 | 8/2002 | Qu et al. | |
| 6,482,866 B1 | 11/2002 | Dahayanake et al. | |
| 6,497,290 B1 | 12/2002 | Misselbrook et al. | |
| 6,506,710 B1 | 1/2003 | Hoey et al. | |
| 6,569,814 B1 | 5/2003 | Brady et al. | |
| 6,599,863 B1 | 7/2003 | Palmer et al. | |
| 6,605,570 B2 | 8/2003 | Miller et al. | |
| 6,613,720 B1 | 9/2003 | Feraud et al. | |
| 6,637,517 B2 | 10/2003 | Samuel et al. | |
| 6,667,280 B2 | 12/2003 | Chang et al. | |
| 6,703,352 B2 | 3/2004 | Dahayanake et al. | |
| 6,767,869 B2 | 7/2004 | DiLullo et al. | |
| 6,828,280 B2 | 12/2004 | England et al. | |
| 6,840,318 B2 | 1/2005 | Lee et al. | |
| 6,908,888 B2 | 6/2005 | Lee et al. | |
| 7,084,095 B2 * | 8/2006 | Lee et al. | 507/261 |
| 2002/0004464 A1 | 1/2002 | Nelson et al. | |
| 2002/0033260 A1 | 3/2002 | Lungwitz et al. | |
| 2002/0147114 A1 | 10/2002 | Dobson et al. | |
| 2002/0193257 A1 | 12/2002 | Lee et al. | |
| 2003/0119680 A1 | 6/2003 | Chang et al. | |
| 2003/0134751 A1 | 7/2003 | Lee et al. | |
| 2003/0139298 A1 | 7/2003 | Fu et al. | |
| 2003/0236174 A1 | 12/2003 | Fu et al. | |
| 2004/0009882 A1 | 1/2004 | Fu | |
| 2004/0063587 A1 | 4/2004 | Horton et al. | |
| 2004/0176478 A1 | 9/2004 | Dahayanake et al. | |
| 2005/0059555 A1 | 3/2005 | Dusterhoft et al. | |
| 2005/0067165 A1 | 3/2005 | Cawiezel et al. | |
| 2005/0107265 A1 | 5/2005 | Sullivan et al. | |
| 2005/0137095 A1 | 6/2005 | Cawiezel et al. | |
| 2006/0111248 A1 | 5/2006 | Lee et al. | |
| 2006/0128597 A1 | 6/2006 | Chen et al. | |
| 2006/0128598 A1 | 6/2006 | Chen et al. | |
| 2006/0185842 A1 | 8/2006 | Chen | |

FOREIGN PATENT DOCUMENTS

| | | |
|---|---|---|
| CA | 1298697 | 4/1992 |
| CA | 2217659 | 4/1998 |
| CA | 2257697 A1 | 6/2000 |
| CA | 2320620 A1 | 3/2001 |
| EP | 0835983 B1 | 12/2003 |
| GB | 1388909 | 3/1975 |
| GB | 2012837 | 8/1979 |
| GB | 2332223 | 6/1999 |
| GB | 2332224 | 6/1999 |
| GB | 2354541 | 3/2001 |
| GB | 2372058 | 8/2002 |
| WO | 9210640 A1 | 6/1992 |
| WO | 9212328 A1 | 7/1992 |
| WO | 9409852 A1 | 5/1994 |
| WO | 9631528 A1 | 10/1996 |
| WO | WO 9856497 A1 * | 12/1998 |
| WO | 9924693 A1 | 5/1999 |
| WO | WO 9932572 A1 * | 7/1999 |
| WO | 9950529 A1 | 10/1999 |
| WO | 9950530 A1 | 10/1999 |
| WO | 0129369 A1 | 4/2001 |
| WO | 02084075 A1 | 10/2002 |
| WO | 03054352 A1 | 7/2003 |
| WO | 03056130 A1 | 7/2003 |
| WO | 03093641 A1 | 11/2003 |
| WO | 2005071038 A1 | 8/2005 |

OTHER PUBLICATIONS

SPE 38622—by Mathew Samuel et al.—Polymer-Free Fluid for Hydraulic Fracturing.
SPE30114—by B. R. Stewart et al.—Use of Solids-Free Viscous Carrying Fluid in Fracturing Applications: An Economic and Productivity Comparison in Shallow Completions.
Aggregation of Alkyltrimethylammonium Surfactants in Aqueous Poly(styrenesulfonate) Solutions. Langmuir 1992, 8, 2405-2412 by Mats Almgren, Per Hansson, Emad Mukhtar, and Jan van Stam.

* cited by examiner

RHEOLOGY ENHANCERS

CROSS REFERENCE TO RELATED APPLICATIONS

This application is a Continuation in Part of prior application Ser. No. 11/334,158 entitled "Foamed Viscoelastic Surfactants," filed Jan. 17, 2006, now U.S. Pat. No. 7,345,012 which is a Continuation in Part of copending application Ser. No. 11/249,233, filed Oct. 13, 2005, entitled "Viscoelastic Surfactant Rheology Modification," which is a Continuation in Part of prior copending application Ser. No. 11/012,446, filed Dec. 15, 2004, entitled "Viscoelastic Surfactant Rheology Modification". This application is also a Continuation in Part of application Ser. No. 10/325,226, filed Dec. 19, 2002, now U.S. Pat. No. 7,084,095 entitled "Methods for Controlling the Rheological Properties of Viscoelastic Surfactants Based Fluids". This application is also a Continuation in Part of prior application Ser. No. 11/033,651, filed Jan. 12, 2005, now U.S. Pat. No. 7,320,952 entitled "Additive for Viscoelastic Fluid," which claimed the benefit of U.S. Provisional Application No. 60/538,025, filed Jan. 21, 2004. This application is related to a U.S. patent application entitled "Rheology Modifiers," filed Apr. 13, 2006, inventors Yiyan Chen, et al.

BACKGROUND OF THE INVENTION

The invention relates to viscoelastic surfactant fluid systems (VES's). More particularly it relates to an additive package for viscoelastic surfactant fluid systems that increases their thermal stability and shortens the time they take to heal after shearing.

Certain surfactants, when in aqueous solution, form viscoelastic fluids. Such surfactants are termed "viscoelastic surfactants", or "VES's". Other components, such as additional VES's, co-surfactants, buffers, acids, solvents, and salts, are optional or necessary (depending upon the specific VES fluid system and the intended use) and perform such functions as increasing the stability (especially thermal stability) or increasing the viscosity of the systems by modifying and/or stabilizing the micelles; all the components together are called a viscoelastic surfactant system or viscoelastic fluid system. Not to be limited by theory, but many viscoelastic surfactant systems form long rod-like or worm-like micelles in aqueous solution. Entanglement of these micelle structures gives viscosity and elasticity to the fluid. For a fluid to have good viscosity and elasticity under given conditions, proper micelles must be formed and proper entanglement is needed. This requires the surfactant's structure to satisfy certain geometric requirements and the micelles to have sufficient length or interconnections for adequate entanglements.

Many chemical additives are known to improve the rheological behavior (greater viscosity and/or greater stability and/or greater brine tolerance and/or lower shear sensitivity and/or faster rehealing if micelles are disrupted, for example by shear). Such materials are typically called co-surfactants, rheology modifiers, or rheology enhancers, etc., and typically are alcohols, organic acids such as carboxylic acids and sulfonic acids, sulfonates, and others. We shall use the term rheology enhancers here. Such materials often have different effects, depending upon their exact composition and concentration, relative to the exact surfactant composition (for example hydrocarbon chain lengths of groups in the surfactant and co-surfactant) and concentration. For example, such materials may be beneficial at some concentrations and harmful (lower viscosity, reduced stability, greater shear sensitivity, longer rehealing times) at others.

In particular, many VES fluid systems exhibit long viscosity recovery times after experiencing prolonged high shear. Slow recovery negatively impacts drag reduction and proppant transport capability, which consequently leads to undesirably high treating pressures and risks of near wellbore screen-outs. Slow recovery of viscosity after shear also means that higher concentrations of viscoelastic surfactants must be used. One way that the expense of higher viscoelastic surfactant concentrations can be offset is to use shear recovery enhancers and/or shear rehealing accelerators that allow the use of lower viscoelastic surfactant concentrations.

SUMMARY OF THE INVENTION

One embodiment is an oilfield treatment method including the steps of a) providing a fluid containing a viscoelastic surfactant selected from zwitterionic, amphoteric, and cationic surfactants and mixtures of these surfactants, b) adding to the fluid a rheology enhancer package at a concentration sufficient to increase the rate of shear rehealing of the fluid, the rheology enhancer package containing a first component containing a block copolymer of polypropylene glycol and polyethylene glycol and a second component containing a polynaphthalene sulfonate, and c) injecting the fluid down a well.

In another embodiment, the rheology enhancer package increases the viscosity of the fluid.

In yet another embodiment, the viscoelastic surfactant includes a zwitterionic surfactant that includes a surfactant or mixture of surfactants having the formul:

in which R is an alkyl group that contains from about 17 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and $CH_2CH_2O$ may also be $OCH_2CH_2$. The zwitterionic surfactant may have the betaine structure:

in which R is a hydrocarbon group that may be branched or straight chained, aromatic, aliphatic or olefinic and has from about 14 to about 26 carbon atoms and may contain an amine; n=about 2 to about 4; and p=1 to about 5. The zwitterionic surfactant may also be a mixture of these compounds. The betaine contains for example oleylamidopropyl betaine, or betaine erucylamidopropyl betaine. The fluid may also contain a co-surfactant.

In yet another embodiment, the viscoelastic surfactant includes a zwitterionic surfactant that includes a surfactant or mixture of surfactants having the formula:

in which $R_1$ has from about 14 to about 26 carbon atoms and may be branched or straight chained, aromatic, saturated or unsaturated, and may include a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5-or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion; and mixtures of these compounds.

In a further embodiment, the cationic surfactant, $R_1$ contains from about 18 to about 22 carbon atoms and may contain a carbonyl, an amide, or an amine; $R_2$, $R_3$, and $R_4$ contain from 1 to about 3 carbon atoms, and $X^-$ is a halide. For example, $R_1$ includes from about 18 to about 22 carbon atoms and may include a carbonyl, an amide, or an amine, and $R_2$, $R_3$, and $R_4$ are the same as one another and include from 1 to about 3 carbon atoms.

In yet a further embodiment, the fluid further contains a member selected from amines, alcohols, glycols, organic salts, chelating agents, solvents, mutual solvents, organic acids, organic acid salts, inorganic salts, oligomers, and mixtures of these members. The member is present, for example, at a concentration of between about 0.01 and about 10 percent, for example at a concentration of between about 0.01 and about 1 percent.

In yet another embodiment, the viscoelastic surfactant includes a surfactant or mixture of surfactants containing and amphoteric surfactant containing an amine oxide, for example an amidoamine oxide.

In another embodiment, the first component is present in the fluid at a concentration of from about 0.005% to about 1 weight %, for example at a concentration of from about 0.01 weight % to about 0.5 weight %. The second component is present in the fluid at a concentration of from about 0.005% to about 1 weight %, for example at a concentration of from about 0.01 weight % to about 0.5 weight %.

In another embodiment, the block copolymer has a mole ratio of polyethylene glycol to polypropylene glycol, for example, of from about 1:1 to about 1:2. The block copolymer may have an inner block containing polyethylene glycol and outer blocks containing polypropylene glycol, or an inner block containing polypropylene glycol and outer blocks containing polyethylene glycol. The block copolymer may have a molecular weight of from about 1000 to about 18,000. The polynaphthalene sulfonate polymer may have a molecular weight of from about 5000 to about 500,000. The weight ratio of the first component (block copolymer) to the second component (polynaphthalene sulfonate) in the fluid depends upon the exact choice of each component, but is, for example, from about 1:5 to about 1:1, preferably from about 1:2 to about 1:3.

In yet another embodiment, the fluid also contains an acid selected from hydrochloric acid, hydrofluoric acid, formic acid, acetic acid, polylactic acid, polyglycolic acid, lactic acid, glycolic acid, sulfamic acid, malic acid, citric acid, tartaric acid, maleic acid, methylsulfamic acid, chloroacetic acid, and mixtures of these acids.

In yet another embodiment, the first component comprises a non-linear copolymer having a structure selected from star, comb, dendritic, brush, graft, and star-branched.

Another embodiment is a method of increasing the rate of shear rehealing of a viscoelastic fluid made with a viscoelastic surfactant including the steps of a) providing a fluid containing a viscoelastic surfactant selected from zwitterionic, amphoteric, and cationic surfactants and mixtures of these surfactants, and b) adding to the fluid a rheology enhancer package at a concentration sufficient to increase the rate of shear rehealing of the fluid, the rheology enhancer package containing a first component containing a block copolymer of polypropylene glycol and polyethylene glycol and a second component containing a polynaphthalene sulfonate.

Yet another embodiment is the use of these fluids when foamed.

Yet another embodiment is a method of using the fluids described above in oilfield treatments, for example drilling, completion, and stimulation. Fluids in accordance with the invention may be used as additives to modify the rheology of oilfield treatment fluids so as to facilitate the use of these fluids for injection or removal from wellbores and formations.

DETAILED DESCRIPTION OF THE INVENTION

When fluids are viscosified by the addition of viscoelastic surfactant systems, the viscosity increase is believed to be due to the formation of micelles, for example worm-like micelles, which entangle to give structure to the fluid that leads to the viscosity. In addition to the viscosity itself, an important aspect of a fluid's properties is the degree and rate of viscosity-recovery or re-healing when the fluid is subjected to high shear and the shear is then reduced. For VES fluids, shear may disrupt the micelle structure, after which the structure reforms. Controlling the degree and rate of reassembling (re-healing) is necessary to maximize performance of the surfactant system for various applications. For example, in hydraulic fracturing it is critical for the fluid to regain viscosity as quickly as possible after exiting the high-shear region in the tubulars and entering the low-shear environment in the hydraulic fracture. On the other hand, it is beneficial in coiled tubing cleanouts to impart a slight delay in regaining full viscosity in order to "jet" the solids more efficiently from the bottom of the wellbore into the annulus. Once in the annulus, the regained viscosity ensures that the solids are effectively transported to the surface.

Viscoelastic surfactant fluid systems have been shown to have excellent rheological properties for hydraulic fracturing applications; however, shear recovery time, not fluid viscosity, often dictates the minimum concentration of surfactant required. For example, a fluid made with a certain concentration of surfactant may show adequate viscosity for fracturing at a given temperature, but the minimal usable concentration may be high due to slow shear recovery with a lower concentration. An acceptable shear recovery time is considered to be 15 seconds. A time longer than 15 seconds will negatively impact drag reduction and proppant transport. Shortening the viscosity-recovery time makes it possible to use VES fluid systems that would otherwise not be suitable in many applications. In addition, when a rheology modifier also increases fluid viscosity, then less surfactant is needed to provide a given viscosity. Examples of rheology enhancers are given in U.S. patent application Ser. Nos. 10/994,664 which is assigned to the same assignee as the present invention and which is hereby incorporated in its entirety.

We have previously found that certain simple additives, when included in certain viscoelastic surfactant fluid systems (such as cationic, amphoteric, and zwitterionic viscoelastic surfactant fluid systems, especially betaine viscoelastic surfactant fluid systems), in the proper concentration relative to the surfactant active ingredient, significantly shorten the shear recovery time of the systems, increasing the viscosity at the same time. In many cases, the shear recovery is nearly instantaneous.

We have now found a new additive package that includes a pair of chemical additives that together are particularly effective for shortening the rehealing time of VES systems after high shear, and increasing the viscosity of VES systems at a given temperature, making the fluids more useful for many purposes, such as, but not limited to, uses as oilfield treatment fluids, especially stimulation fluids, most especially hydraulic fracturing fluids. We will call these materials "rheology enhancers" here, and the pair of additives together is called a "rheology enhancer package". The rheology enhancer package extends the conditions under which the VES systems can be used, and reduces the amount of surfactant needed, which in turn reduces the cost and improves clean-up.

One component of the rheology enhancer package of the invention is, for example, a block copolymer of polyethylene glycol (which will be abbreviated PEG) and polypropylene glycol (which will be abbreviated (PPG). (Note that polyethylene glycol is also known as polyethylene oxide and polypropylene glycol is also known as polypropylene oxide.) The PEG and PPG blocks are connected by ether linkages (with the oxygen coming from the end PEG or PPG of one of the blocks) and terminate with —OH groups (with the oxygen coming from the end PEG or PPG of one of the blocks). The block copolymers may be of the structure PPG-PEG-PPG, PEG-PPG-PEG, or PPG-PEG, where it is understood that PPG-PEG-PPG for example is shorthand for:

where PO is propylene oxide and EO is ethylene oxide. Typically, x=z, and x is from 3 to about 1000 and y is from 3 to about 1000. These polymers be linear, or the overall polymer or individual blocks may be branched, or may have a comb, dendritic, brush, graft, star or star-branched shape. The linear polymers are preferred. The overall polymers or the individual blocks may contain other monomers or polymers such as vinyl esters, vinyl acrylates, and the corresponding hydrolyzed groups, and if so they may be random, alternating, or block copolymers. When they contain other polymers, the amount must be sufficiently small that the hydrophobicity or hydrophilicity of each part of the polymer is not affected enough to excessively decrease the effectiveness of the polymer.

Examples of these block copolymers having PEG inner blocks having symmetrical PPG blocks (outer blocks) on either end include the symmetric block copolymers ANTAROX™ 17-R-2 and ANTAROX™ 31-R-1, available from Rhodia, Inc., Cranbury, N.J., U.S.A. In this terminology, the first number is an arbitrary code number based on the average numerical values of x and y, the letter R indicates that the central block is PEG, and the second number indicates the approximate average mole ratio of PO:EO monomer units. Thus ANTAROX™ 17-R-2 is HO—(PO)$_x$-(EO)$_y$—(PO)$_z$—OH in which x=12 and y=9, and in ANTAROX™ 31-R-1, x=21 and y=7. The molecular weights of these examples are less than 3000. Preferred molecular weights range from about 1000 to about 18,000. These materials are also known as "Meroxapol's". The corresponding materials having a PPG core (inner block) and two symmetrical PEG blocks (outer blocks) are known as Poloxamer's". Examples of these block copolymers are also sold by BASF under the name PLURONIC™ (with different rules for the codes in the names) with approximately 10 to 80% polyoxyethylene, and average molecular weights ranging from about 1100 to about 17,400. We have shown the structures of these polymers as having hydroxyl groups at both ends, which would be the case if they are manufactured by certain methods. If they are manufactured by other methods, then one termination could be hydroxyl and one could be hydrogen, or both could be hydrogen. It is to be understood that when we show any one such structure, we intend it to represent one having any combination of —OH and —H terminal groups. Also, these block copolymers may have saturated or unsaturated, linear or branched, alkyl groups, having from one to about 12, preferably from one to about 4, carbon atoms, at either or both ends. Some of these block copolymers are known to promote foaming, and some are known to promote defoaming. Suitable block copolymers may be chosen with these functions in mind.

The second component of the rheology enhancer package of the invention is, for example, a polynaphthalene sulfonate such as DAXAD™ 17 and DAXAD™ 19, available from GEO Specialty Chemicals, Cleveland, Ohio, U.S.A.; these materials are available as liquid concentrates and as solids and may also contain small amounts of sodium formate, sodium 2-naphthalenesulfonic acid, water, and sodium sulfate. These materials differ in their molecular weights; DAXAD™ 17 has a molecular weight of about 30000, and DAXAD™ 19 has a molecular weight of about 70000. Suitable polynaphthalene sulfonate polymers have a molecular weight of from about 5000 to about 500,000.

The principal role of the block copolymer is to shorten the shear recovery time of the viscoelastic surfactant fluid; it also increases the viscosity under certain shear and temperature conditions. The principal role of the polynaphthalene sulfonate is to increase the viscosity, especially at intermediate temperatures. Suitable concentrations of the rheology enhancer packages are from about 0.005 weight % to about 1 weight %, for example from about 0.01 weight % to about 0.5 weight % (of the as received materials in the final fluid). Suitable concentrations of the rheology enhancer packages are from about 0.1% to about 10% of the concentration of active viscoelastic surfactant, for example from about 0.5% to about 7%. Suitable weight ratios of the block copolymer to the polynaphthalene sulfonate range from about 1:5 to about 1:1.

The rheology enhancer packages of the present invention give the desired results with cationic, amphoteric, and zwitterionic viscoelastic surfactant systems. They have been found to be particularly effective with certain zwitterionic surfactants. In general, particularly suitable zwitterionic surfactants have the formula:

in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and $CH_2CH_2O$ may also be $OCH_2CH_2$.

Preferred zwitterionic surfactants include betaines. Two suitable examples of betaines are BET-O and BET-E. The surfactant in BET-O-30 is shown below; one chemical name is oleylamidopropyl betaine. It is designated BET-O-30 because as obtained from the supplier (Rhodia, Inc. Cranbury, N.J., U.S.A.) it is called Mirataine BET-O-30 because it contains an oleyl acid amide group (including a $C_{17}H_{33}$ alkene tail group) and contains about 30% active surfactant; the remainder is substantially water, sodium chloride, and propylene glycol. An analogous material, BET-E-40, is also available from Rhodia and contains an erucic acid amide group (including a $C_{21}H_{41}$ alkene tail group) and is approximately 40% active ingredient, with the remainder being substantially water, sodium chloride, and isopropanol. The surfactant in BET-E-40 is also shown below; one chemical name is erucylamidopropyl betaine. As-received concentrate of BET-E-40 was used in the experiments reported below, where it will be referred to as "VES". BET surfactants, and other VES's that are suitable for the present Invention, are described in U.S. Pat. No. 6,258,859. According to that patent, BET surfactants make viscoelastic gels when in the presence of certain organic acids, organic acid salts, or inorganic salts; in that patent, the inorganic salts were present at a weight concentration up to about 30 weight % of the liquid portion of the system. Co-surfactants may be useful in extending the brine tolerance, and to increase the gel strength and to reduce the shear sensitivity of the VES-fluid, in particular for BET-O-type surfactants. An example given in U.S. Pat. No. 6,258,859 is sodium dodecylbenzene sulfonate (SDBS), also shown below. Other suitable co-surfactants include, for example those having the SDBS-like structure in which x=5-15; preferred co-surfactants are those in which x=7-15. Still other suitable co-surfactants for BET-O-30 are certain chelating agents such as trisodium hydroxyethylethylenediamine triacetate. The rheology enhancer packages of the present invention may be used with viscoelastic surfactant fluid systems that contain such additives as co-surfactants, organic acids, organic acid salts, and/or inorganic salts.

Surfactant in BET-O-30 (when n=3 and p=1)

Surfactant in BET-E-40 (when n=3 and p=1)

SDBS (when x=11 and the counterion is $Na^+$)

Preferred embodiments of the present invention use betaines; most preferred embodiments use BET-E-40. Although experiments have not been performed, it is believed that mixtures of betaines, especially BET-E-40, with other surfactants are also suitable. Such mixtures are within the scope of embodiments of the invention.

Other betaines that are suitable include those in which the alkene side chain (tail group) contains 17-23 carbon atoms (not counting the carbonyl carbon atom) which may be branched or straight chained and which may be saturated or unsaturated, n=2-10, and p=1-5, and mixtures of these compounds. More preferred betaines are those in which the alkene side chain contains 17-21 carbon atoms (not counting the carbonyl carbon atom) which may be branched or straight chained and which may be saturated or unsaturated, n=3-5, and p=1-3, and mixtures of these compounds. These surfactants are used at a concentration of about 0.5 to about 5 weight %, preferably from about 1 to about 2.5 weight % (concentration of as-received viscoelastic surfactant concentrate in the fluid).

Exemplary cationic viscoelastic surfactants include the amine salts and quaternary amine salts disclosed in U.S. Pat. Nos. 5,979,557, and 6,435,277 which have a common Assignee as the present application and which are hereby incorporated by reference.

Examples of suitable cationic viscoelastic surfactants include cationic surfactants having the structure:

$R_1N^+(R_2)(R_3)(R_4)X^-$ in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5-or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Cationic surfactants having the structure $R_1N^+(R_2)(R_3)(R_4)X^-$ may optionally contain amines having the structure $R_1N(R_2)(R_3)$. It is well known that commercially available cationic quaternary amine surfactants often contain the corresponding amines (in which $R_1$, $R_2$, and $R_3$ in the cationic surfactant and in the amine have the same structure). As received commercially available VES surfactant concentrate formulations, for example cationic VES surfactant formulations, may also optionally contain one or more members of the group consisting of alcohols, glycols, organic salts, chelating agents, solvents, mutual solvents, organic acids, organic acid salts, inorganic salts, oligomers, polymers, co-polymers, and mixtures of these members.

Another suitable cationic VES is erucyl bis(2-hydroxyethyl)methyl ammonium chloride, also known as (Z)-13 docosenyl-N—N-bis(2-hydroxyethyl)methyl ammonium chloride. It is commonly obtained from manufacturers as a mixture containing about 60 weight percent surfactant in a mixture of isopropanol, ethylene glycol, and water. Other suitable amine salts and quaternary amine salts include (either alone or in combination in accordance with the invention), erucyl trimethyl ammonium chloride; N-methyl-N,N-bis (2-hydroxyethyl) rapeseed ammonium chloride; oleyl methyl bis(hydroxyethyl) ammonium chloride; erucylamidopropyltrimethylamine chloride, octadecyl methyl bis(hydroxyethyl)ammonium bromide; octadecyl tris(hydroxyethyl)ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl)ammonium 3,4-dichlorobenzoate; cetyl tris(hydroxyethyl) ammonium iodide; cosyl dimethyl hydroxyethyl ammonium bromide; cosyl methyl bis(hydroxyethyl)ammonium chloride; cosyl tris(hydroxyethyl) ammonium bromide; dicosyl dimethyl hydroxyethyl ammonium bromide; dicosyl methyl bis(hydroxyethyl)ammonium chloride; dicosyl tris(hydroxyethyl)ammonium bromide; hexadecyl ethyl bis(hydroxyethyl)ammonium chloride; hexadecyl isopropyl bis(hydroxyethyl)ammonium iodide; and cetylamino, N-octadecyl pyridinium chloride.

Many fluids made with viscoelastic surfactant systems, for example those containing cationic surfactants having structures similar to that of erucyl bis(2-hydroxyethyl) methyl ammonium chloride, inherently have rheology enhancer packages of the present invention may not be needed except under special circumstances, for example at very low temperature.

Amphoteric viscoelastic surfactants are also suitable. Exemplary amphoteric viscoelastic surfactant systems include those described in U.S. Pat. No. 6,703,352, for example amine oxides. Other exemplary viscoelastic surfactant systems include those described in U.S. Patent Application Nos. 2002/0147114, 2005/0067165, and 2005/0137095, for example amidoamine oxides. These four references are hereby incorporated in their entirety. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide (these are weight percents of a concentrate used to make the final fluid).

Viscoelastic surfactant fluids, for example those used in the oilfield, may also contain agents that dissolve minerals and compounds, for example in formations, scale, and filtercakes. Such agents may be, for example, hydrochloric acid, formic acid, acetic acid, lactic acid, glycolic acid, sulfamic acid, malic acid, citric acid, tartaric acid, maleic acid, methylsulfamic acid, chloroacetic acid, aminopolycarboxylic acids, 3-hydroxypropionic acid, polyaminopolycarboxylic acids, for example trisodium hydroxyethylethylenediamine triacetate, and salts of these acids and mixtures of these acids and/or salts. For sandstone treatment, the fluid also typically contains a hydrogen fluoride source. The hydrogen fluoride source may be HF itself or may be selected from animonium fluoride and/or ammonium bifluoride or mixtures of the two; when strong acid is present the HF source may also be one or more of polyvinylammonium fluoride, polyvinylpyridinium fluoride, pyridinium fluoride, imidazolium fluoride, sodium tetrafluoroborate, animonium tetrafluoroborate, and salts of hexafluoroantimony. When the formation-dissolving agent is a strong acid, the fluid preferably contains a corrosion inhibitor. The fluid optionally contains chelating agents for polyvalent cations, for example especially aluminum, calcium and iron (in which case the agents are often called iron sequestering agents) to prevent their precipitation. Some of the formation-dissolving agents just described are such chelating agents as well. Chelating agents are added at a concentration, for example, of about 0.5 weight % (of active ingredient in the liquid phase). When VES fluids contain strong acids, they are typically not gelled and display low viscosity; when the pH increases as the acid reacts with the mineral, the system gels and the viscosity increases. Such fluids may be called viscoelastic diverting acids. Schlumberger Technology Cornoration markets viscoelastic diverting agents under the trademark VDA®, a registered trademark of Schlumberger Technology Corooration. The rheology enhancer packages of the present invention may be used in viscoelastic surfactant fluid systems containing acids and chelating agents.

Preparation and use (mixing, storing, pumping, etc.) of the viscoelastic surfactant fluid systems containing rheology enhancer packages of the invention are the same as for such fluids without the rheology enhancer packages. For example, the order of mixing of the components in the liquid phase is not affected by including these rheology enhancer packages. Optionally, the rheology enhancer packages may be incorporated in surfactant concentrates (provided that they do not affect component solubilities or concentrate freezing points) so that the concentrates can be diluted with an aqueous fluid to make VES systems. This maintains the operational simplicity of the VES systems. Alternatively, the rheology enhancer packages may be provided as separate concentrates in solvents such as water, isopropanol, and mixtures of these or other solvents. The active rheology enhancer in such concentrates is, for example, from about 10 to about 50% by weight, for example from about 10 to about 40 weight %. As is normally the case in fluid formulation, laboratory tests should be run to ensure that the additives do not affect, and are not affected by, other components in the fluid (such as salts, for example). In particular, the rheology enhancer packages of the present invention may be used with other rheology modifiers. Adjusting the concentrations of surfactant, rheology enhancer package, and other fluid components to account for the effects of other components is within the scope of the invention.

The fluid may be used, for example in oilfield treatments. As examples, the fluid may be used as a pad fluid and/or as a carrier fluid and/or as a diverter in hydraulic fracturing, as a carrier fluid for lost circulation control agents, as a carrier fluid for gravel packing, and as a diverter or a main fluid in acidizing and acid fracturing. The fluids may also be used in other industries, such as in household and industrial cleaners, agricultural chemicals, personal hygiene products, and in other fields.

The optimal concentration of a given rheology enhancing additive package of the invention for a given choice of VES surfactant fluid system at a given concentration and temperature, and with given other materials present can be determined by simple experiments. The total viscoelastic surfactant concentration must be sufficient to form a stable fluid with suitable shear recovery time under conditions (time and temperature) at which the system will be used. The appropriate amounts of surfactant and rheology enhancer package are those necessary to achieve the desired stability and shear reheal time as determined by experiment. Again, tolerance for, and optimal amounts of other additives may also be determined by simple experiment. In general, the amount of surfactant (as-received viscoelastic surfactant concentrate in the fluid) is from about 0.5 to about 10 weight %, preferably from about 1 to about 5 weight %. Commercially available surfactant concentrates may contain some materials that are themselves rheology enhancers, although they may be present for example for concentrate freezing point depression, so the amount of surfactant and rheology enhancer package used is determined for the specific concentrate used. Mixtures of surfactants and/or mixtures of rheology enhancer packages (including mixtures of more than one rheology enhancer package of the invention, and mixtures of one or more rheology enhancer packages of the invention with one or more other rheology enhancers) may be used. Mixtures of surfactants may include surfactants that are not viscoelastic surfactants when not part of a viscoelastic surfactant system. All mixtures are tested and optimized; for example, too much total rheology enhancer may decrease the beneficial effects.

EXPERIMENTAL

The present invention can be further understood from the following examples. In the examples, the zwitterionic surfactant concentrate BET-E-40 is called "VES". ANTAROX™ 17-R-2 is called "A-17" and ANTAROX™ 31-R-1 is called "A-31". DAXAD™ 17 is called "D-17" and DAXAD™ 19 is called "D-19". Concentrations given were weight % of the as received materials in the final fluid, except for the concentrations of the DAXAD's, which are given as weight % of the polymer in the final fluid.

Example 1

Figure 1:
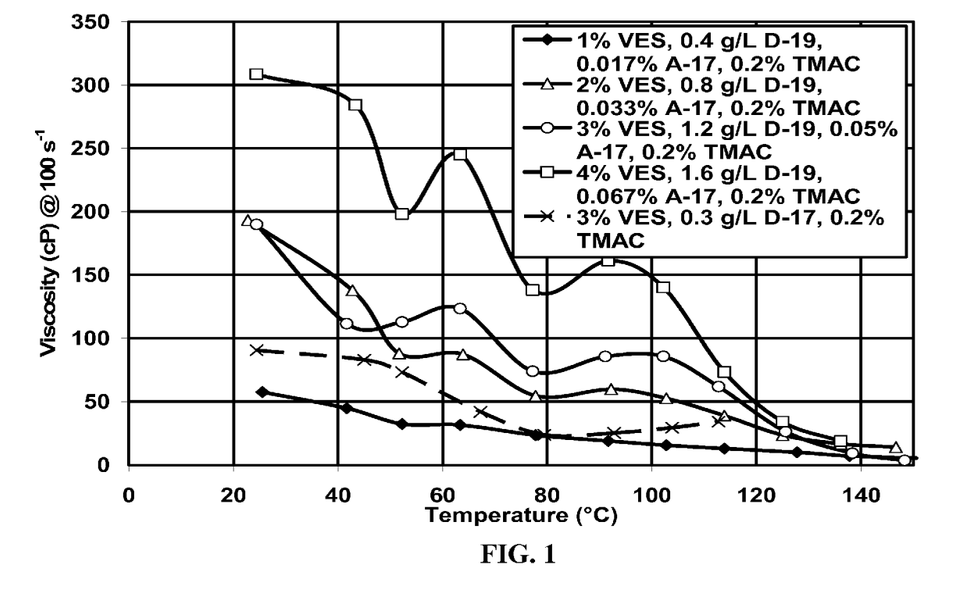
FIG. 1 shows the viscosity as a function of temperature for various concentrations of a viscoelastic surfactant fluid containing a rheology enhancer package of the invention.

FIG. 1 shows the viscosity as a function of temperature for various concentrations of VES containing the rheology enhancer package D-19 plus A-17. The weight ratios of VES:D-19:A-17 were constant. The profiles are compared to that for 3% VES containing D-17 and no block copolymer additive. Tetramethylammonium chloride (TMAC) was added as a clay stabilizer (which would typically be needed if the fluid were to be used as a fracturing fluid) because these fluids perform better with TMAC than with other clay stabilizers such as KCl. It can be seen that the viscosities increased with increasing concentrations of VES containing this rheology enhancer package; the viscosity with only 2% VES and this package was higher than with 3% VES containing only D-17. At intermediate temperatures, the viscosity with only 1% VES and this package was about the same as with 3% VES containing only D-17.

Example 2

Figure 2:
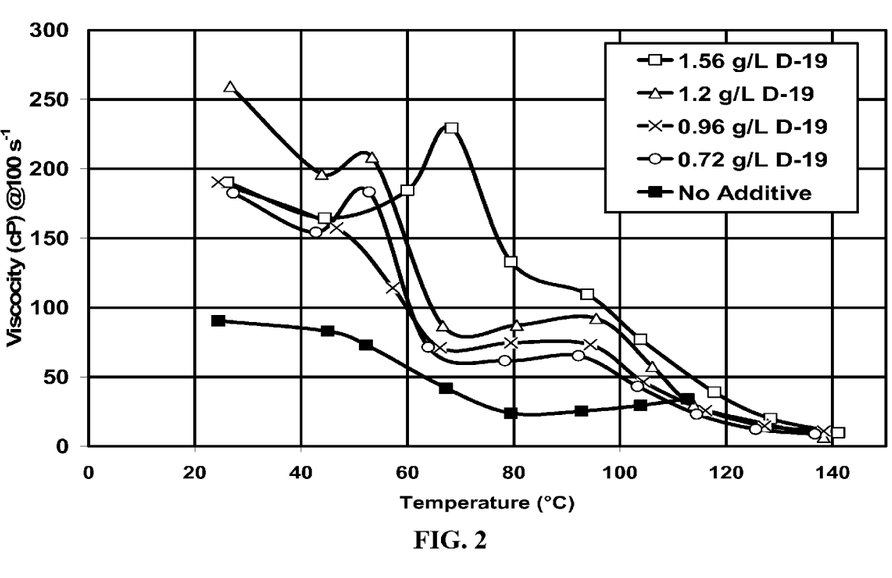
FIG. 2 shows the viscosity as a function of temperature for fluids containing a constant amount of a viscoelastic surfactant and of one component of the rheology enhancer package of the invention, and varying amounts of a second component of the rheology enhancer package of the invention.

FIG. 2 shows the viscosity as a function of temperature for fluids containing 3% by weight as received VES, 0.08% by weight as received A-17, and varying amounts of D-19 in 2% TMAC. It can be seen that at temperatures below about 110° C. increasing amounts of D-19 increased the viscosity of the fluid.

Example 3

Figure 3:
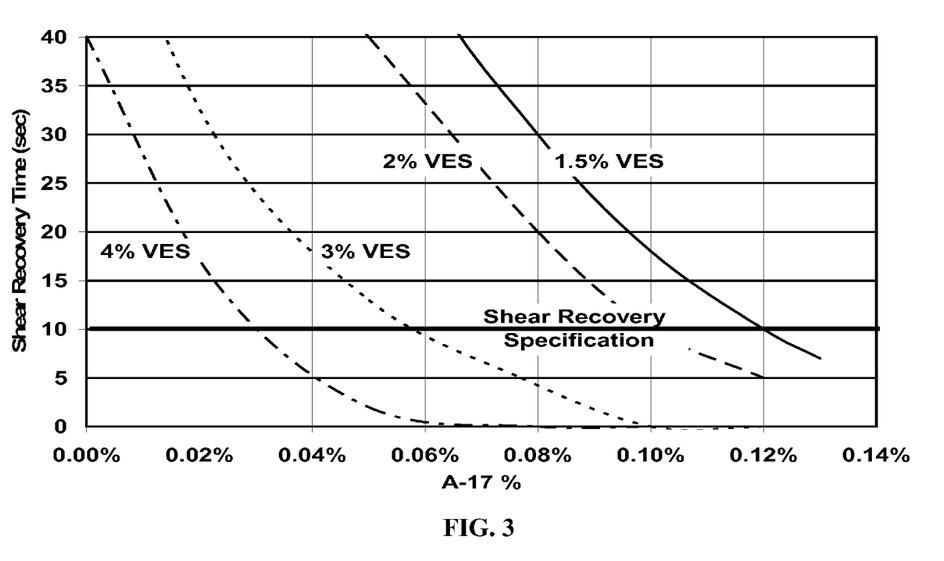
FIG. 3 shows the effect of varying concentrations of one component of the enhancer package of the invention on the shear recovery time of a fluid containing a several concentrations of viscoelastic surfactant and a constant ratio of the second component to the viscoelastic surfactant.

The shear recovery times were determined in experiments in which approximately 200 mL of already-mixed VES fluid was sheared at no less than 10,000 rpm for no less than 30 seconds and no more than 1 minute in a 1 L Waring blender. The shearing was stopped and timing was begun. The fluid was poured back and forth between a beaker and the blender cup and the fluid recovery was characterized by two times, referred to as the initial and final recovery times; both were estimated by visual observation. The initial fluid recovery time was the time at which fluid "balling" occurred (when the fluid showed the first signs of elasticity as indicated by the fluid taking a longer time to achieve a flat surface in the receiving beaker when poured). The final fluid recovery time was the time at which fluid "lipping" occurred. The fluid "lips" when inclining the upper beaker or cup containing the fluid does not result in fluid flow into the container below, but rather the formation of a "lip," and pulling the upper container back to a vertical position pulls the "lip" back into the upper container. In fracturing fluid practice, "lipping" is used to estimate when the fluid reaches its near-equilibrium elasticity. FIG. 3 shows the effect of A-17 concentration on the shear recovery time of a fluid containing four different concentrations of VES, a constant weight ratio of VES to D-19 of 25:1, and varying amounts of A-17. It can be seen that increasing amounts of the block copolymer were required to reduce the shear recovery time to less than 10 seconds as the concentration of the viscoelastic surfactant was decreased. However, the target of less than 10 seconds was achieved at all VES concentrations with very low A-17 concentrations.

Example 4

Figure 4:
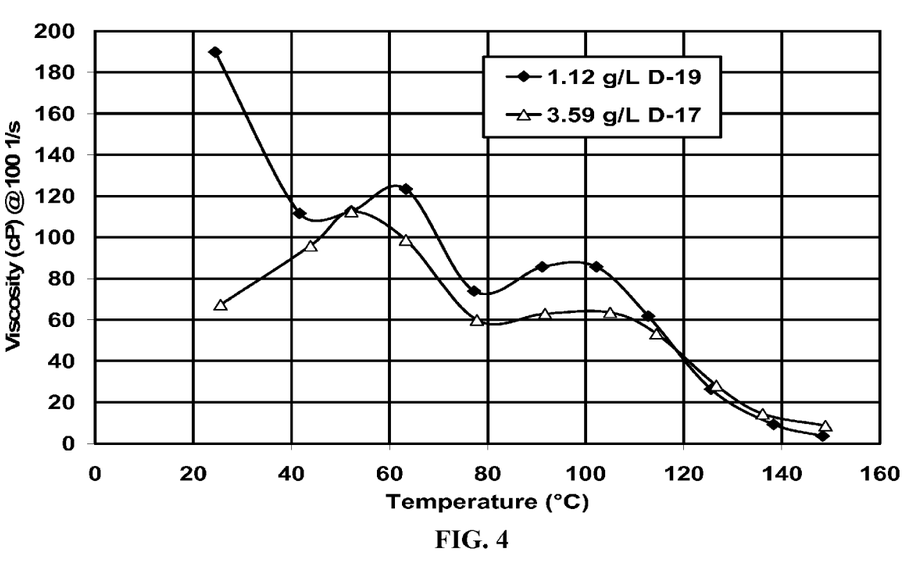
FIG. 4 compares the viscosities of fluids made with the same concentration of a viscoelastic surfactant and the same concentration of one component of the rheology enhancer package of the invention, and different concentrations of two examples of a second component of the package.

FIG. 4 compares the viscosities of fluids made with 3% VES, 0.05% A-17, and either D-17 or D-19. It can be seen that less than one third the concentration of D-19 gave better viscosity than D-17. Furthermore, the final shear recovery for the fluid with D-17 was more than 300 seconds, but the final shear recovery for the fluid with the D-19 was only 11 seconds.

Example 5

Figure 5:
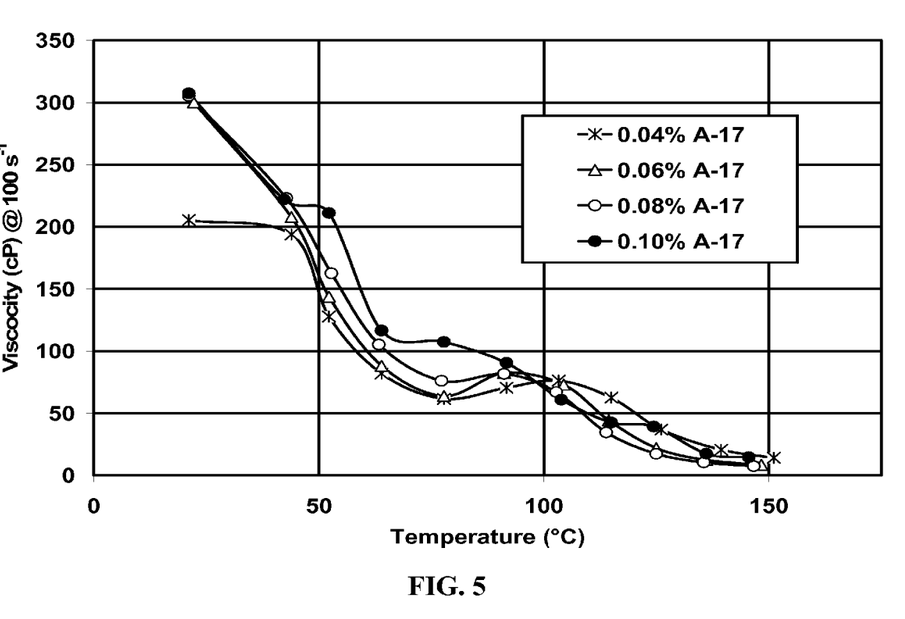
FIG. 5 shows the effect of varying the concentration of one example of a block copolymer component of the rheology enhancer package of the invention in a viscoelastic surfactant fluid as a function of temperature.

FIG. 5 shows the effect of A-17 concentration on fluids containing 3% VES and 0.12% D-17. It can be seen that at temperatures below about 95° C., increasing A-17 slightly increased the viscosity, while at temperatures above about 95° C., there was almost no effect.

Example 6

Figure 6:
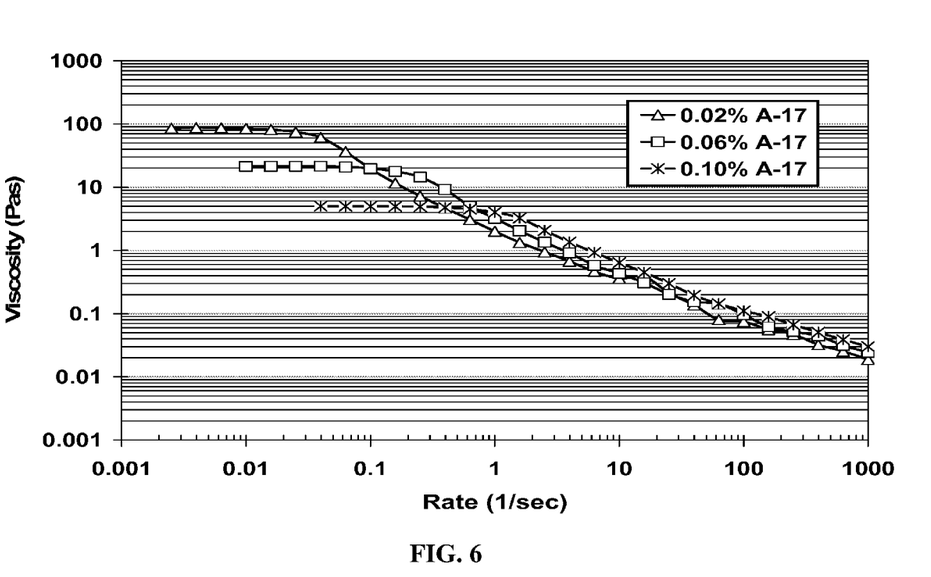
FIG. 6 shows the effect on the low shear viscosity of varying the concentration of one example of a block copolymer component of the rheology enhancer package of the invention in a viscoelastic surfactant fluid, while keeping the concentration of a second component constant.

FIG. 6 shows the effect of varying the concentration of A-17 on the low shear viscosity of a fluid containing 3% VES, 0.12% D-19, and 0.2% TMAC. It can be seen that increasing amounts of A-17 decreased the low shear viscosity and increased the shear rate at which the viscosity leveled off.

Example 7

Figure 7:
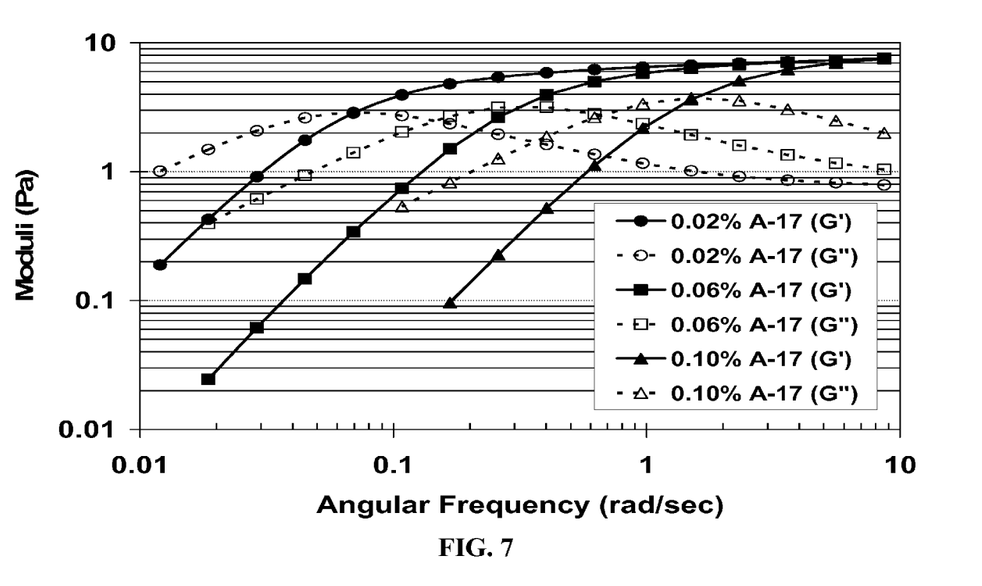
FIG. 7 shows the effect on the dynamic loss modulus and dynamic storage modulus of varying the concentration of one example of a block copolymer component of the rheology enhancer package of the invention in a viscoelastic surfactant fluid, while keeping the concentration of a second component constant.

FIG. 7 shows the dynamic loss modulus and the dynamic storage modulus of fluids containing 3% VES, 0.12% D-19, 0.2% TMAC, and varying amounts of A-17. An increase in the concentration of A-17 increased the cross over frequency of the two moduli, which in turn indicated shorter relaxation times. The longer the relaxation time, the more the fluid behaved like a gel.

Example 8

Figure 8:
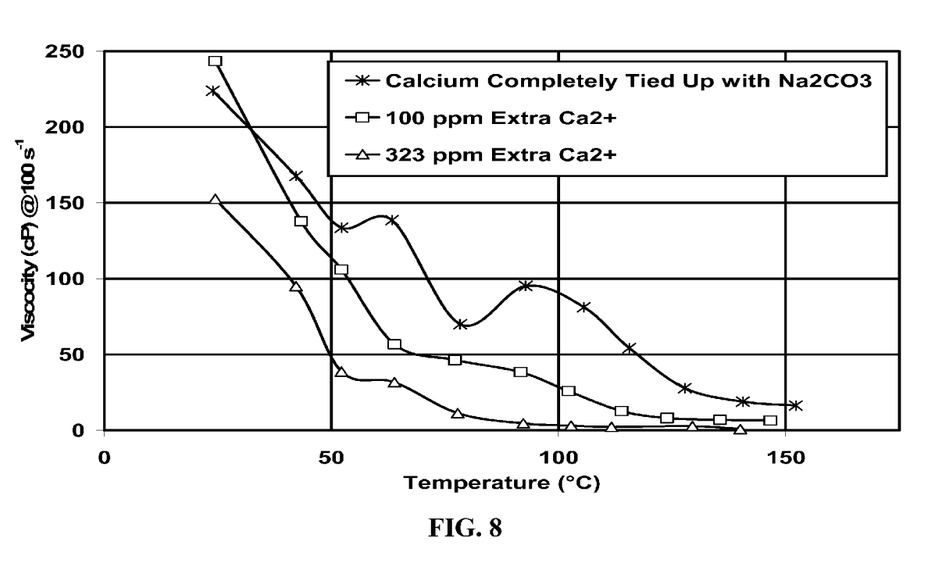
FIG. 8 shows the effect on the viscosity of adding $Ca^{2+}$ to a fluid containing a viscoelastic surfactant and a rheology enhancer package of the invention and then reacting some or all of the $Ca^{2+}$ with $Na_2CO_3$.
Figure 9:
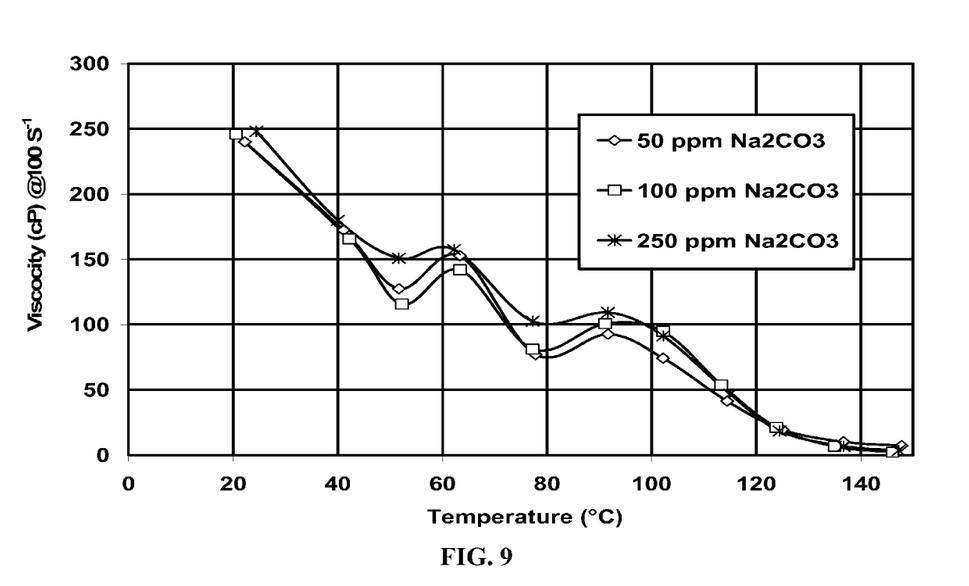
FIG. 9 shows the effect of added $Na_2CO_3$ on the viscosity of a fluid containing a viscoelastic surfactant and a rheology enhancer package of the invention.

The fluid is somewhat sensitive to calcium ions. FIG. 8 shows the effect of adding about 40 ppm (parts per million) of $Ca^{2+}$ to a fluid containing 3% VES, 0.12% D-19, 0.05% A-17, and 0.2% TMAC and then adding an amount of $Na_2CO_3$ sufficient to react completely with the $Ca^{2+}$. The viscosity was satisfactory. However, if there was excess $Ca^{2+}$, then the viscosity was substantially reduced. On the other hand, excess $Na_2CO_3$ did not cause any problems, as shown in FIG. 9 for a fluid containing 3% VES, 0.12% D-19, 0.05% A-17, 0.2% TMAC, and varying amounts of $Na_2CO_3$, so clearly it is easy to control $Ca^{2+}$ with $Na_2CO_3$.

We claim:

1. An oilfield method for hydraulic fracturing, gravel packing or hydraulic fracturing and gravel packing comprising:
   a. viscosifying a fluid with a viscoelastic surfactant system comprising a viscoelastic surfactant selected from at least one of zwitterionic, amphoteric, and cationic surfactants and mixtures thereof, said fluid having an entangled micelle structure capable of rehealing after shear,
   b. adding to said fluid a rheology enhancer package increasing the viscosity of said fluid and decreasing the time of shear rehealing of said fluid to less than 15 seconds, said rheology enhancer package comprising from about 0.005 weight percent to about 0.5 weight percent of a first component comprising a block copolymer of polypropylene glycol and polyethylene glycol and from about 0.005 weight percent to about 0.5 weight percent of a second component comprising a polynaphthalene sulfonate, and
   c. injecting said fluid down a well.

2. The method of claim 1 wherein said viscoelastic surfactant comprises a zwitterionic surfactant.

3. The method of claim 1 wherein said zwitterionic surfactant comprises a surfactant or mixture of surfactants having the formula:

wherein R is an alkyl group that contains from about 17 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from b 0 to 14; and $CH_2CH_2O$ may also be $OCH_2CH_2$.

4. The method of claim 1 wherein said zwitterionic surfactant has the betaine structure:

wherein R is a hydrocarbon group that may be branched or straight chained, aromatic, aliphatic or olefinic and has from about 14 to about 26 carbon atoms and may contain an amine; n=about 2 to about 4; and p=1 to about 5, and mixtures of these compounds.

5. The method of claim 4 wherein said betaine comprises oleylamidopropyl betaine.

6. The method of claim 4 wherein said betaine comprises erucylamidopropyl betaine.

7. The method of claim 4 wherein said fluid further comprises a co-surfactant.

8. The method of claim 1 wherein said viscoelastic surfactant comprises a cationic surfactant.

9. The method of claim 8 wherein said cationic surfactant comprises a surfactant or mixture of surfactants having the structure:

in which $R_1$ has from about 14 to about 26 carbon atoms and may be branched or straight chained, aromatic, saturated or unsaturated, and may comprise a carbonyl, an amide, a retroamide, an imide, a urea, or an amine; $R_9$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5-or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion; and mixtures of these compounds.

10. The method of claim 9 wherein $R_1$ comprises from about 18 to about 22 carbon atoms and may comprise a carbonyl, an amide, or an amine; $R_2$, $R_3$, and $R_4$ comprise from 1 to about 3 carbon atoms, and $X^-$ is a halide.

11. The method of claim 10 wherein $R_1$ comprises from about 18 to about 22 carbon atoms and may comprise a carbonyl, an amide, or an amine, and $R_2$, $R_3$, and $R_4$ are the same as one another and comprise from 1 to about 3 carbon atoms.

12. The method of claim 1 wherein said fluid further comprises a member selected from at least one of amines, alcohols, glycols, organic salts, chelating agents, solvents, mutual solvents, organic acids, organic acid salts, inorganic salts, oligomers, and mixtures of said members.

13. The method of claim 12 wherein said member is present at a concentration of between about 0.01 and about 10 percent.

14. The method of claim 12 wherein said member is present at a concentration of between about 0.01 and about 1 percent.

15. The method of claim 1 wherein said amphoteric surfactant comprises an amine oxide.

16. The method of claim 15 wherein said amine oxide comprises an amidoamine oxide.

17. The method of claim 1 wherein said block copolymer has a mole ratio of polyethylene glycol to polypropylene glycol of from about 1:1 to about 1:2.

18. The method of claim 1 wherein said block copolymer has an inner block comprising polyethylene glycol and outer blocks comprising polypropylene glycol.

19. The method of claim 1 wherein said block copolymer has an inner block comprising polypropylene glycol and outer blocks comprising polyethylene glycol.

20. The method of claim 1 wherein said block copolymer has a molecular weight of from about 1000 to about 18,000.

21. The method of claim 1 wherein said polynaphthalene sulfonate polymer has a molecular weight of from about 5000 to about 500,000.

22. The method of claim 1 wherein the weight ratio of said first component to said second component in the fluid is from about 1:5 to about 1:1.

23. The method of claim 1 wherein said fluid further comprises an acid selected from at least one of hydrochloric acid, hydrofluoric acid, formic acid, acetic acid, polylactic acid, polyglycolic acid, lactic acid, glycolic acid, sulfamic acid, malic acid, citric acid, tartaric acid, maleic acid, methylsulfamic acid, chloroacetic acid, and mixtures thereof.

24. The method of claim 1 wherein said first component comprises a non-linear copolymer having a structure selected from star, comb, dendritic, brush, graft, and star-branched.

25. A method of increasing the rate of shear rehealing of a viscoelastic fluid made with a viscoelastic surfactant comprising:
   a. providing a viscosified fluid useful for oilfield fracturing, gravel packing or oilfield fracturing and gravel packing comprising a viscoelastic surfactant selected from at least one of zwitterionic, amphoteric, and cationic surfactants and mixtures thereof, said fluid having a micelle structure capable of rehealing after shear;
   b. adding to said fluid a rheology enhancer package comprising from about 0.005 weight percent to about 0.5 weight percent of a first component comprising a block copolymer of polypropylene glycol and polyethylene glycol and a from about 0.005 weight percent to about 0.5 weight percent of second component comprising a polynaphthalene sulfonate;
   c. subjecting the fluid to shear to disrupt the micelle structure and thereafter rehealing the micelle structure, wherein a rehealing time is less than 15 seconds.

26. An oilfield treatment fluid comprising:
   a. a viscoelastic surfactant selected from at least one of zwitterionic, amphoteric, and cationic surfactants and mixtures thereof, having an entangled micelle structure capable of rehealing after shear,
   b. said fracturing fluid further comprising a rheology enhancer, thereby increasing the rate of shear rehealing of said fluid such that rehealing time is less than 15 seconds, said rheology enhancer comprising a from about 0.005 weight percent to about 0.5 weight percent of first component comprising a block copolymer of polypropylene glycol and polyethylene glycol; and from about 0.005 weight percent to about 0.5 weight percent of a second component comprising a polynaphthalene sulfonate, and
   c. a liquid carrier.

27. An oilfield method for hydraulic fracturing, gravel packing or hydraulic fracturing and gravel packing comprising:
   a. viscosifying a fluid with a viscoelastic surfactant system comprising a viscoelastic surfactant selected from at least one of zwitterionic, amphoteric, and cationic surfactants and mixtures thereof, said fluid having an entangled micelle structure capable of rehealing after shear,
   b. adding to said fluid a rheology enhancer package increasing the viscosity of said fluid and decreasing the time of shear rehealing of said fluid to less than 15 seconds, said rheology enhancer package comprising from about 0.005 weight percent to about 0.5 weight percent of a first component comprising a block copolymer of polypropylene glycol and polyethylene glycol and from about 0.005 weight percent to about 0.5 weight percent of a second component comprising a polynaphthalene sulfonate,
   c. injecting said fluid down a well, and
   d. shearing the viscosified fluid to disrupt the micelle structure and then reducing shear for said rehealing.

28. The method of claim 27 wherein said shearing occurs in a tubular during said injection and said rehealing occurs upon exiting the tubular.

* * * * *